United States Patent

Taniyama et al.

[11] 4,167,537
[45] Sep. 11, 1979

[54] SURFACE-TREATING COATING COMPOSITION FOR PLASTIC ARTICLES

[75] Inventors: Susumu Taniyama, Toyonaka; Hiromitsu Takanohashi, Takarazuka; Shoichi Inoue, Itami, all of Japan

[73] Assignee: Mitsubishi Gas Chemical Company, Inc., Japan

[21] Appl. No.: 869,863

[22] Filed: Jan. 16, 1978

[30] Foreign Application Priority Data

Jan. 20, 1977 [JP] Japan .................. 52-4394

[51] Int. Cl.$^2$ .................. C08L 61/28; C08L 83/06
[52] U.S. Cl. .................. 525/443; 525/446; 260/21; 260/33.6 SB; 525/445
[58] Field of Search .................. 260/826, 21, 850

[56] References Cited

U.S. PATENT DOCUMENTS

| | | | |
|---|---|---|---|
| 3,425,974 | 2/1969 | Semroc | 260/826 |
| 3,837,876 | 9/1974 | Mayuzumi et al. | 260/46.5 E |
| 3,919,150 | 11/1975 | Kiel | 260/826 |
| 3,988,523 | 10/1976 | McCombs | 260/826 |

*Primary Examiner*—Wilbert J. Briggs, Sr.
*Attorney, Agent, or Firm*—Wenderoth, Lind & Ponack

[57] ABSTRACT

A surface-coating composition for plastic articles, which comprises as a film-forming agent (A) a mixture of the reaction of an aminoalkylalkoxy silane of the general formula

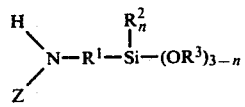

wherein $R^1$ represents a divalent hydrocarbon group containing 1 to 4 carbon atoms, $R^2$ and $R^3$ represent a monovalent hydrocarbon group containing 1 to 4 carbon atoms, Z represents a hydrogen atom or an aminoalkyl group, and n is 0 or 1, with an epoxyalkylalkoxy silane of the general formula

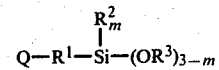

wherein $R^1$, $R^2$ and $R^3$ are as defined above, Q represents a glycidoxy group

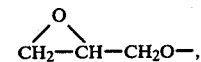

or an epoxycyclohexyl group, and m is 0 or 1, and (B) a mixture of an alkyl-modified methylol melamine of the general formula

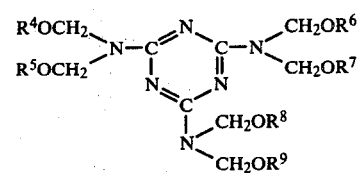

wherein $R^4$, $R^5$, $R^6$, $R^7$, $R^8$ and $R^9$ represent a hydrogen atom or a monovalent hydrocarbon group with 1 to 4 carbon atoms, and an alkyd resin; the amount of component (A) being 45 to 80% by weight, and the amount of component (B) being 20 to 55% by weight, both based on the total amount of components (A) and (B). The composition may further contain (C) an acrylic acid derivative of the general formula

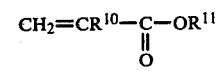

wherein $R^{10}$ represents a hydrogen atom or a methyl group, and $R^{11}$ represents a hydrogen atom, a hydrocarbon group containing 1 to 4 carbon atoms, a hydroxyalkyl group or a glycidyl group, or its polymer of a low degree of polymerization, the amount of component (C) being 5 to 30% by weight based on the total amount of components (A), (B) and (C).

6 Claims, No Drawings

SURFACE-TREATING COATING COMPOSITION FOR PLASTIC ARTICLES

BACKGROUND OF THE INVENTION

1. Field of the Invention

This invention relates to a surface-treating coating composition for plastic articles, and more specifically, to a surface-treating coating composition which finishes the plastic articles to provide scratch-free surfaces and has superior durability in long-term outdoor use.

2. Description of the Prior Art

Transparent plastic articles, for example amorphous shaped articles of thermoplastic resins such as polycarbonate, poly(methyl methacrylate), cellulose butyrate, polyvinyl chloride and polystyrene have heretofore been considered to be useful in many applications as glass substitutes because of their transparency and light weight. They have, however, had only limited applications because they are susceptible to scratch and tend to lose transparency.

In an attempt to remove such a defect, a method has been suggested which involves coating a transparent paint on the surface of a transparent plastic article to form a protective film. However, paints used for this conventional method are either unsatisfactory in scratch resistance, or even when having satisfactory scratch resistance, lack adhesion to a substrate resin or durability in outdoor use which are important properties in actual use. For example, U.S. Pat. No. 3,451,838 suggests a method which comprises coating the surface of an acrylic resin or polycarbonate resin article with a paint composed of a mixture of methyltriethoxysilane and phenyltriethoxysilane, and curing the coating. The plastic article surface-coated by this method, however, has inferior scratch resistance, and therefore, has only limited applications.

U.S. Pat. No. 3,961,977 discloses a method which comprises coating a plastic article with a coating agent composed of a partially hydrolyzed product of an epoxyalkylalkoxy silane and an aminoalkylalkoxy silane and an organic solvent. The plastic article surface-coated by this method has very good scratch resistance, but on the other hand, suffers from low resistance to hydrolysis and to light so that in outdoor use, the coating undergoes cracking and peeling within short periods of time.

SUMMARY OF THE INVENTION

It is an object of this invention therefore to provide a surface-coating composition for plastic articles which has superior scratch resistance and durability.

According to this invention, there is provided a surface-coating composition for plastic articles, which comprises as a film-forming agent (A) a mixture of the reaction of an aminoalkylalkoxy silane of the general formula

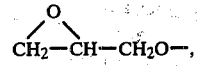 (I)

wherein $R^1$ represents a divalent hydrocarbon group containing 1 to 4 carbon atoms, $R^2$ and $R^3$ represent a monovalent hydrocarbon group containing 1 to 4 carbon atoms, Z represents a hydrogen atom or an amino-alkyl group, and n is 0 or 1, with an epoxyalkylalkoxy silane of the general formula

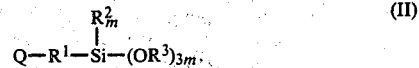 (II)

wherein $R^1$, $R^2$ and $R^3$ are defined above, Q represents a glycidoxy group $$CH_2\text{—}CH\text{—}CH_2O\text{—},$$
$$\diagdown O \diagup$$

or an epoxycyclohexyl group, and m is 0 or 1, and (B) a mixture of an alkyl-modified methylol melamine of the general formula

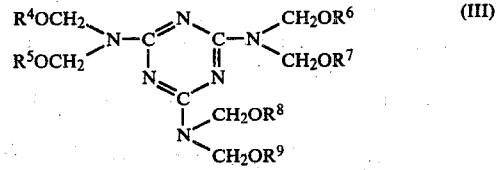 (III)

wherein $R^4$, $R^5$, $R^6$, $R^7$, $R^8$, and $R^9$ represent a hydrogen atom or a monovalent hydrocarbon group with 1 to 4 carbon atoms, and an alkyd resin; the amount of component (A) being 45 to 80% by weight, and the amount of component (B) being 20 to 55% by weight, both based on the total amount of components (A) and (B).

In another aspect, the present invention provides a surface-coating composition for plastic articles, which, in addition to components (A) and (B) above, comprises (C) an acrylic acid derivative of the formula

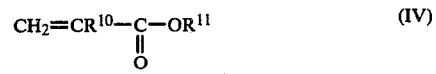 (IV)

wherein $R^{10}$ represents a hydrogen atom or a methyl group, $R^{11}$ represents a hydrogen atom or a monovalent hydrocarbon group with 1 to 4 carbon atoms, a hydroxyalkyl group or a glycidyl group, or its polymer of a low degree of polymerization as a film-forming agent; the amount of component (A) being 45 to 80% by weight and the amount of component (B) being 20 to 59% by weight, both based on the total weight of components (A) and (B), and the amount of component (C) being 5 to 30% by weight based on the total weight of components (A), (B) and (C).

By applying the coating composition of this invention to a plastic shaped article and drying it under heat, a protective coating having superior scratch resistance, durability and light resistance is formed on its surface.

DETAILED DESCRIPTION OF THE INVENTION

The compositon of this invention is a mixture of components (A) and (B). Component (A) is a reaction mixture (to be referred to as a silane derivative reaction mixture) of an aminoalkylalkoxy silane of formula (I) (to be referred to as an amino-containing silane derivative) with an epoxyalkylalkoxy silane of formula (II) (to be referred to as an epoxy-containing silane derivative). Component (B) (to be referred to as a melamine-alkyd resin) is a mixture of an alkyl-modified methylol mela-

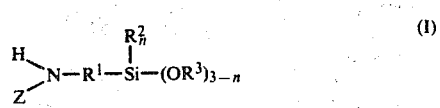

mine of formula (III) (to be referred to as modified melamine) with an alkyd resin. If desired, the coating composition of this invention may further contain an acrylic acid derivative of formula (IV) as component (C), in addition to components (A) and (B).

Examples of suitable amino-containing silane derivatives of formula (I) are aminomethyltriethoxy silane [NH$_2$CH$_2$Si(OC$_2$H$_5$)$_3$], N-β-aminoethylaminomethyltrimethoxy silane [NH$_2$CH$_2$CH$_2$NHCH$_2$Si(OCH$_3$)$_3$], γ-aminopropyltriethoxy silane [NH$_2$CH$_2$CH$_2$CH$_2$Si(OC$_2$H$_5$)$_3$], N-(trimethoxysilylpropyl)ethylenediamine [NH$_2$CH$_2$CH$_2$NHCH$_2$CH$_2$CH$_2$Si(OCH$_3$)$_3$], and N-(dimethoxymethylsilylpropyl)-ethylenediamine

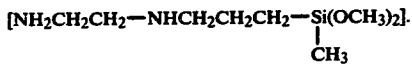

Examples of suitable epoxy-containing silane derivatives of formula (II) are:

γ-glycidoxypropyltrimethoxy silane

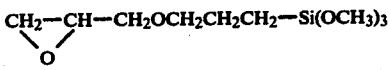

β-(3,4-epoxycyclohexyl)ethyltrimethoxy silane

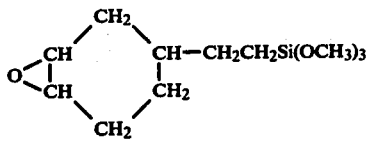

γ-glycidoxypropylmethyldimethoxy silane

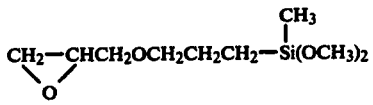

and β-(3,4-epoxycyclohexyl)ethylmethyldimethoxy silane

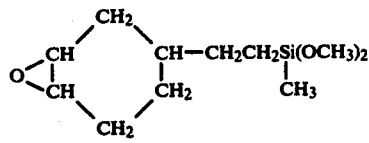

Examples of suitable modified melamines of formula (III) are hexamethylol melamine, methyl-etherified methylol melamine, ethyl-etherified methylol melamine, propyl-etherified methylol melamine, isopropyl-etherified methylol melamine, butyl-etherified methylol melamine, and isobutyl-etherified methylol melamine.

Examples of suitable alkyd resins include polycondensates formed between polybasic acids such as phthalic acid, isophthalic acid, maleic acid, fumaric acid, azelaic acid, adipic acid and sebasic acid, and polyhydric alcohols such as glycerol, pentaerythritol, trimethylol ethane, sorbitol, trimethylol propane, ethylene glycol, propylene glycol, neopentyl glycol and dipropylene glycol, and products obtained by modifying these polycondensates with various fatty acid esters. Products obtained by modifying these polycondensates with silicones, epoxies, isocyanates or acrylic acid derivatives can also be used. The alkyd resins per se are known.

Examples of suitable acrylic acid derivatives of formula (IV) include acrylic acid, methacrylic acid, methyl acrylate, methyl methacrylate, ethyl acrylate, ethyl methacrylate, propyl acrylate, propyl methacrylate, butyl acrylate, butyl methacrylate, 2-hydroxyethyl methacrylate, glycidyl methacrylate, and polymers of these with a low degree of polymerization. The polymers with a low degree of polymerization, or simply "low polymer", as used in the present application denote low-molecular-weight polymers which have miscibility with the mixture of components (A) and (B).

The component (A) in the coating composition of this invention is a reaction mixture obtained by mixing the amino-containing silane derivative of formula (I) with the epoxy-containing silane derivative of formula (II) and reacting the mixture. To obtain coated films of good performance, it is desirable that the amount of the amino-containing silane derivative should be 20 to 70 mole%, and the amount of the epoxy-containing silane derivative should be 30 to 80 mole%. If the amount of the amino-containing silane derivative is less than 20 mole%, or higher than 70 mole%, the desired properties tend to be unobtainable, and the scratch resistance, adhesion and hot water resistance of the coated films are reduced. For example, when the amount of the amino-containing silane derivative is less than 20 mole%, the resulting coating composition is rated B-C in a steel wool test, showing a reduction in scratch resistance. On the other hand, when the amount of the amino-containing silane derivative is above 70 mole%, the adhesion of the resulting coated film is almost 0 in a 1-hour hot water resistance test, showing a reduction in hot water resistance. Especially preferably, the amount of the amino-containing silane derivative is 45 to 25 mole%, and the amount of the epoxy-containing silane derivative is 75 to 55 mole%, in the silane derivative reaction mixture, and based on the entire mixture, 5 to 35 mole% of a dimethoxymethyl silane derivative such as N-(dimethoxymethylsilylpropyl)-ethylenediamine is included.

Component (B) is a mixture of the modified melamine of formula (III) and the alkyd resin. Preferably, the amount of the modified melamine is 10 to 70% by weight, and the amount of the alkyd resin is 30 to 90% by weight. If the amount of the melamine-alkyd resin is less than 10% by weight, the hot water resistance of the resulting coated film is reduced. If it exceeds 70% by weight, the scratch resistance of the coating is reduced.

The mixing ratio of components (A) and (B) has an important bearing on the properties of the coated film. In order for the coating composition of this invention to have both good scratch resistance and durability, it is essential that the amount of component (A) should be 45 to 80% by weight, and the amount of component (B) should be 20 to 55% by weight, both based on the total weight of components (A) and (B). If the amount of component (A) is more than 80% by weight or the amount of component (B) is less than 20% by weight, the hot water resistance of the resulting coated film is reduced. On the other hand, if the amount of component (A) is less than 45% by weight, and the amount of component (B) is more than 55% by weight, the scratch resistance of the resulting coated film is reduced.

So long as the mixing ratio of components (A) and (B) fulfills the above-specified requirement, the coating composition of the invention comprising components (A) and (B) is far superior to known coating compositions. The present inventors have found that when a further improvement is hot water resistance is desired, a coating composition comprising component (C) in addition to components (A) and (B) in useful. For this purpose, the amount of component (C) must be 5 to 30% by weight based on the total weight of components (A), (B) and (C), in addition to the previous requirement that the amount of component (A) is 45 to 80% by weight, and the amount of component (B) is 20 to 55% by weight, both based on the total weight of components (A) and (B). If the amount of component (C) is less than 5% by weight, scarcely any effect of adding component (C) is achieved. On the other hand, if the amount of component (C) exceeds 30% by weight, an undesirable opalescent haze appears in the final coated film, and its scratch resistance and hot water resistance also tend to be reduced. Such defects resulting from the addition of an excessive amount of the acrylic acid derivative (component C) are believed to be due to the poor compatibility of component (C) as can be demonstrated by a compatibility test on a low polymer of the acrylic acid derivative in regard to the silane derivative reaction mixture and the melamine-alkyd resin.

The coating composition of this invention requires a small amount of an aromatic hydrocarbon such as toluene or xylene in order to dissolve the melamine-alkyd resin. However, since the other ingredients are liquid and have good compatibility with the melamine-alkyd resin, no special solvent is required to dissolve and mix the ingredients of the coating composition. Accordingly, the coating composition of this invention has advantages as a high-solid low-polluting paint with a markedly reduced content of solvent. When a diluting solvent is required to adjust the coating thickness of the final product, alcohols, ketones and ethers, for example, can be used as the diluting solvent. Of these, alcohols, and alkyl ethers of ethylene glycol are preferred from the viewpoint of preventing corrosion of a plastic article.

The superior properties of the coated film in accordance with this invention appear by curing the coated film under heat. Usually, the heat-curing is carried out at a temperature of 100° to 130° C. for 2 to 4 hours. The use of a curing catalyst can promote the curing reaction, and render the heat-curing conditions milder. Examples of such a catalyst are inorganic and organic acids such as phosphoric acid, hydrochloric acid, sulfuric acid, and p-toluenesulfonic acid, and metal salts of organic acids such as cobalt naphthenate, zinc naphthenate and copper naphthenate.

The coating composition of this invention is described in greater detail below with reference to the use of, as a substrate, a polycarbonate resin produced by reacting 4,4'-dihydroxydiphenyl-2,2-propane and phosgene.

The ingredients of the coating composition of this invention were separately coated on the surfaces of polycarbonate articles, allowed to stand at room temperature for 30 minutes, and then heated at 130° C. for 4 hours. The adhesion, scratch resistance and hot water resistance of each of the resulting cured coatings were examined, and the results are summarized in Table 1.

In Table 1, samples (I) and (II) denote the case of using only component (A); samples (III) and (IV), to the case of using modified melamine alone; samples (V) and (VI), to the case of using the alkyd resin alone; and samples (VII), (VIII) and (IX), to the case of using the melamine-alkyd resin alone.

Table 1

| Sample No. | Coating composition | Adhesion after curing (*1) | Scratch resistance Steel wool test (*2) | Scratch resistance Taber abrasion test (*3) | Hot water resistance (*4) |
|---|---|---|---|---|---|
| (I) | Reaction mixture of an amino-containing silane derivative and an epoxy-containing silane derivative; no diluent nor catalyst (*5) | Peeled at the time of the curing treatment | Could not be measured because the coating peeled off at the time of the curing treatment | | |
| (II) | Reaction mixture of an amino-containing silane derivative and an epoxy-containing silane derivative; no diluent nor catalyst (*6) | Peeled at the time of the curing treatment | Could not be measured because the coating peeled off at the time of the curing treatment | | |
| (III) | Isobutyl-etherified methylol melamine, diluent (xylene/isobutyl alcohol), catalyst (cobalt naphthenate) | O | B | — | Could not be treated because the adhesion was O. |
| (IV) | n-butyl-etherified methylol melamine, diluent (xylene/isobutyl alcohol), catalyst (cobalt naphthenate) | O | B | — | Could not be treated because the adhesion was O. |
| (V) | Phthalic acid-type alkyd resin (*7), diluent (xylene/isobutyl alcohol), | O | C | — | Could not be treated because the adhesion was O. |

Table 1-continued

| | | | | | |
|---|---|---|---|---|---|
| (VI) | Isophthalic acid-type alkyd resin (*8), diluent (xylene/isobutyl-alcohol), catalyst (cobalt naphthenate) | O | C | — | Could not be treated because the adhesion was O. |
| (VII) | Melamine-alkyd resin (*9) | O | B-C | 75-70 | Could not be treated because the adhesion was O. |
| (VIII) | Melamine-alkyd resin (*10) | O | B-C | 75-70 | Could not be treated because the adhesion was O. |
| (IX) | Melamine-alkyd resin (*11) | O | C | 70-60 | Could not be treated because the adhesion was O. |

(*1): Eleven cuts were provided at intervals of 1 mm on the coated surface so that they crossed one another at right angles. An adhesive tape was caused to adhere firmly to the cut surface, and a peeling force was exerted abruptly at right angles to the tape. The adhesion is expressed by the number of squares which remained unpeeled.

(*2): The coated surface was rubbed through 15 reciprocations with #0000 steel wool lightly pressed on the coated surface. The extent of scar on the coated surface was rated in four grades in which: A': no scar was formed A: not more than 10 scars were formed B: more than 10 scars were formed, but the coated surface still retained gloss C: numerous scars were formed, and the coated surface lost gloss.

(*3): By the method of ASTM D-1044, the coated surface was abraded 50 times by CS-10 wheels under a load of 1000 g, and the transmittance of parallel rays through the abraded surface was measured. The result is expressed as the percentage of the measured transmittance to that before abrasion. Larger numbers show higher resistance to scratch. (The measurement was made at three points, and the final measured values were an average of the three replicates.)

(*4): A coated test piece was dipped in hot water at 60° C., and a change in appearance and its adhesion were tested. The hot water resistance is expressed by the time which lapsed until the adhesion of the test piece became less than 100, and by the adhesion at this time.

(*5): A reaction mixture of 1 mole of N-(trimethoxysilylpropyl)-ethylenediamine and 1 mole of γ-glycidoxypropyltrimethoxy silane without using a diluting solvent.

(*6): A reaction mixture of 0.25 mole of N-(trimethoxysilylpropyl)-ethylenediamine, and 1 mole of γ-glycidoxypropyltrimethoxy silane, without using a diluting solvent.

(*7): Beccosol J507, a trademark for a product of Dainippon Ink and Chemicals, Inc.; phthalic anhydride content 42%, acid number less than 12, specific gravity 0.98–0.99, modified with soybean oil.

(*8): Superbeccosol ES-4011, a trademark for a product of Dainippon Ink and Chemicals, Inc.

(*9): A mixture of isobutyl etherified methylol melamine and a phthalic acid type alkyd resin (Beccosol J507) in a weight ratio of 1:1; diluent (xylene/isobutanol); catalyst (cobalt naphthenate).

(*10): A mixture of n-butyl-etherified methylol melamine and an isophthalic acid type alkyd resin (Superbeccosol ES-4011) in a weight ratio of 1:1; diluent (xylene/isobutanol); catalyst (cobalt naphthenate).

(*11): A mixture of isobutyl-etherified methylol melamine and a phthalic acid-type alkyd resin (Beccosol J507) in a weight ratio of 3:7; diluent (xylene/isobutanol); catalyst (cobalt naphthenate).

It is clear from the experimental results shown in Table 1 that when the constituent ingredients of the coating composition of this invention are individually used as coating agents, the resulting coatings have no adhesion to the polycarbonate resin article, and are valueless as paints. Furthermore, the melamine-alkyd resin ingredient is poor in scratch resistance in addition to its absence of adhesion.

U.S. Pat. No. 3,961,977 discloses that a product obtained by diluting the reaction mixture (I) or (II) of the amino-containing silane derivative and the epoxy-containing silane derivative shown in Table 1 above with isobutanol and partially hydrolyzing a part of the methoxy group with water gives a cured coated film having good adhesion. However, in the case of using a hydrolyzed product of the silane derivative reaction mixture (I), the hot water resistance of the cured coated film is about 2 hours at best. In the case of using a hydrolyzed product of the silane derivative reaction mixture (II), the hot water resistance of the cured coated film increases to about 8 hours, showing some improvement over the case of the reaction mixture (I). However, when the latter coated film is subjected to an environmental test stipulated in MIL STD 202D-106 in which the heat cycle of −10° to −20° C.⇌65° C. is performed in a high-humidity atmosphere with one cycle consuming 24 hours, the adhesion of the film after one heat cycle becomes zero. Thus, its durability is not yet satisfactory.

Furthermore, unless the silane derivative is diluted with isobutanol, etc. to a concentration of not more than 20% by weight, its partial hydrolysis reaction proceeds excessively, and the silane derivative is gelled to a solid. Hence, the final paint is very dilute with a solids content of less than 20% by weight. If such a paint is applied, the thickness of the final coating is at most about 5μ, and usually 1 to 3μ, and such a thickness is insufficient from the point of view of both scratch resistance and durability.

Generally, the durability of a coated film in outdoor exposure is evaluated by the durability to the action of water (resistance to hydrolysis), the action of light (resistance to deterioration by ultraviolet light), the action of repeated changes of temperature (heat cycle, evaluated by a temperature-humidity cycle test generally called an environmental test), and an accidental physical action. Experience tells however that in any case the small thickness of coatings is disadvantageous in regard to any of these actions.

The various ingredients shown in Table 1 were mixed to form coating compositions. The coating compositions were applied and cured in the same way as indicated above with regard to Table 1. The results are shown in Table 2.

In Table 2, coating compositions (X) to (XIII) are a mixture of component (A) with modified melamine, and coating composition (XIV) is a mixture of component (A) with an alkyd resin. All of these coating compositions are outside the scope of the present invention. On the other hand, coating compositions (XV) to (XVIII) are 1:1 (weight) mixtures of component (A) and component (B), which are within the scope of the present invention.

have drastically reduced adhesion after the curing treatment.

Table 3 shows the results obtained by coating and curing coating compositions comprising especially preferred combinations of components (A) and (B) in varying mixing ratios in the same way as described hereinabove with regard to Table 1.

The silane derivative reaction mixture (component A) shown in Table 3 is a reaction product of 2.5 g (0.011

Table 2

| Sample No. | Coating composition | Adhesion after the curing treatment | Steel wool test | Hot water resistance, time (adhesion) |
|---|---|---|---|---|
| (X) | 1:1 mixture of (I) and (III), catalyst (cobalt naphthenate) | 0 | A | — |
| (XI) | 1:1 mixture of (I) and (IV), catalyst (cobalt naphthenate) | 0 | A | — |
| (XII) | 1:1 mixture of (II) and (III), catalyst (cobalt naphthenate) | 0 | A | — |
| (XIII) | 1:1 mixture of (II) and (IV), catalyst (cobalt naphthenate) | 0 | A | — |
| (XIV) | 1:1 mixture of (II) and (V), catalyst (cobalt naphthenate) | 0 | A | — |
| (XV) | 1:1 mixture of (I) and (VII), catalyst (cobalt naphthenate) | 100 | A | 4 (50) |
| (XVI) | 1:1 mixture of (I) and (VIII), catalyst (cobalt naphthenate) | 100 | A | 4 (50) |
| (XVII) | 1:1 mixture of (II) and (VII), catalyst (cobalt naphthenate) | 100 | A | 4 (80) |
| (XVIII) | 1:1 mixture of (II) and (VIII), catalyst (cobalt naphthenate) | 100 | A | 4 (80) |

The numbers denoting the ingredients of the coating compositions are the same as those in Table 1.

As shown by the experimental results in Table 2, the coating compositions (XV) to (XVIII) in accordance with this invention composed of components (A) and (B) show good results in any of adhesion after curing, the steel wool test (scratch resistance) and hot water resistance. It is surprising to note that coating compositions lacking one of the components specified in the present invention, that is the coating compositions (X) to (XIII) not containing an alkyd resin, and the coating composition (XIV) not containing modified melamine, mole) of N-(trimethoxysilylpropyl)-ethylenediamine, 7.0 g (0.034 mole) of N-(dimethoxymethylsilylpropyl)-ethylenediamine and 20.6 g (0.087 mole) of γ-glycidoxypropyltrimethoxysilane. The amount of the amino-containing silane derivative is 34 mole%, and the epoxy-containing silane derivative is 66 mole%, in this reaction mixture. The amount of the dimethoxymethylsilane derivative is 26 mole% based on the entire mixture. The melamine-alkyd resin (component B) shown in Table 3 is a mixture of isobutyl-etherified methylol melamine and a phthalic acid-type alkyd resin in a weight ratio of 1:1.

Table 3

| Sample No. | Amount of the silane derivative reaction mixture (g) | Amount of the melamine alkyd resin [g(wt.%)] | Adhesion after the curing treatment | Scratch resistance | | Hot water resistance [time (adhesion)] |
|---|---|---|---|---|---|---|
| | | | | Steel wool test | Taber abrasion test | |
| XIX | 10 | 1.5(13) | 100 | A' | 97 | 1 (0) |
| XX | 10 | 3 (23) | 100 | A' | 95 | 16 (10) |
| XXI | 10 | 4 (29) | 100 | A' | 95 | 24 (10) |
| XXII | 10 | 6 (38) | 100 | A' | 95 | 16 (50) |
| XXIII | 10 | 8 (44) | 100 | A | 90 | 16 (30) |
| XXIV | 10 | 10 (50) | 100 | A | 90 | 8 (80) |
| XXV | 10 | 15 (60) | 70–60 | B | 85 | 2 (0) |
| XXVI | 10 | 0 | Peeled during | — | — | — |

Table 3-continued

| Sample No. | Amount of the silane derivative reaction mixture (g) | Amount of the melamine alkyd resin [g(wt.%)] | Adhesion after the curing treatment | Scratch resistance | | Hot water resistance [time (adhesion)] |
|---|---|---|---|---|---|---|
| | | | curing | Steel wool test | Taber abrasion test | |

Note:
The percentages in the parentheses in the third column of Table 3 represent weight percent based on the total weight of components (A) and (B).

The experimental results in Table 3 show that the mixing ratios of components (A) and (B) specified in the present invention are important. If the amount of the melamine alkyd resin (component B) is less than 20% by weight, the hot water resistance of the cured coating is reduced, and if it exceeds 55% by weight, the scratch resistance of the coating decreases.

Table 4 summarizes the results which were obtained by coating and curing coating compositions comprising component (C) as well as components (A) and (B) in the same way as described hereinabove with regard to Table 1. In Table 4, components (A) and (B) in Table 4 are the same as components (A) and (B) used in Table 3. Methyl methacrylate (MMA for short) was used as component (C) (acrylic acid derivative).

Table 4

| Sample No. | Amount of the silane derivative reaction mixture (g) (A) | alkyd-resin [g(wt.%)] (B) | Amount of the melamine Amount of MMA [g(wt.%)] (C) | Adhesion after the curing treatment | Scratch resistance | | Hot water resistance [time (adhesion)] |
|---|---|---|---|---|---|---|---|
| | | | | | Steel wool test | Taber abrasion test | |
| XXVII | 10 | 3 (23) | 4 (24) | 100 | A - A' | 92 | 24 (50) |
| XXVIII | 10 | 4 (29) | 4 (22) | 100 | A - A' | 92 | 24 (80) |
| XXIX | 10 | 6 (33) | 4 (20) | 100 | A - A' | 92 | 32 (40) |
| XXX | 10 | 8 (44) | 4 (18) | 100 | A - A' | 92 | 40 (20) |
| XXXI | 10 | 10 (50) | 4 (17) | 100 | A' | 95 | 40 (20) |
| XXXII | 10 | 12 (55) | 4 (15) | 100 | A | 90 | 32 (98) |
| XXXIII | 10 | 5 (33) | 2 (12) | 100 | A' | 95 | 32 (98) |
| XXXIV | 10 | 5 (33) | 1 (6) | 100 | A - A' | 95 | 24 (72) |
| XXXV | 10 | 5 (33) | 0.5(3) | 100 | A - A' | 95 | 16 (50) |
| XXXVI | 10 | 5 (33) | 10 (40) | 100* | B | 85 | 16 (20) |

*A pale opalescent haze was observed in the coated film.

The parentheses in the third column show the weight percent based on (A)+(B); and the parentheses in the fourth column show the weight percent based on (A)+(B)+(C).

It can be seen from a comparison of Table 3 with Table 4 that the addition of component (C) increases the hot water resistance of the coated film. It is when the amount of component (C) is at least 5% by weight that such an effect appears definitely. On the other hand, if the amount of component (C) is more than 30% by weight, an opalescent haze appears in the final coated film, and its scratch resistance and hot water resistance tend to be reduced.

The coated films prepared from the coating compositions of this invention which are shown in Table 4 had durability in ultraviolet light resistance and resistance to heat-humidity cycle (environmental test) in addition to hot water resistance.

The coating compositions of this invention are high solids-type paints, and can be diluted to desired concentrations by various solvents. Accordingly, they can be applied by any known method such as dip coating, spray coating, flow coating and roll coating.

Since the coating composition of this invention has superior adhesion to organic materials, and the curing conditions, that is the heating temperature and time, can be selected freely to some extent according to the selection of catalyst. Accordingly, it is suitable for application to various plastic shaped articles.

Examples of plastic articles suitable for application of the coating composition of this invention are transparent articles of such plastics as polycarbonate resins derived from bisphenols and halogenated bisphenols as monomers, poly(methyl methacrylate), polystyrene, an acrylonitrile/styrene copolymer, and polyvinyl chloride; and non-transparent articles of such plastics as ABS and PPO.

The coating composition of this invention may be incorporated with usual additives such as ultraviolet absorbers, antioxidants and antistatic agents in amounts which do not deteriorate the properties of the resulting coated films.

The following Examples and Comparative Examples illustrate the present invention more specifically.

EXAMPLES 1 to 5

A reactor having four openings was charged with 2.5 g (0.011 mole) of N-(trimethoxysilylpropyl)-ethylenediamine and 7.0 g (0.034 mole) of N-(dimethoxymethylsilylpropyl)-ethylenediamine, and with stirring, they were heated to 100° C. With stirring, 20.6 g (0.087 mole) of γ-glycidoxypropyltrimethoxy silane was added dropwise, whereupon the mixture became somewhat viscous. The mixture was stirred for an additional 30 minutes to afford a silane derivative reaction mixture (component A). To a solution of 10 g of the resulting reaction mixture in 25 g of isobutanol was added a melamine-alkyd resin (component B) obtained by mixing isobutyl-etherified methylol melamine (Yuban 60R, a trademark for a product of Mitsui Toatsu Chemical Co., Inc.) and a phthalic anhydride-type alkyd resin (Beccosol J-507, a trademark for a product of Dainippon Ink and Chemicals, Inc.) in a weight ratio (as solids) of 1:1 in each of the amounts shown in Table 5. A small amount of cobalt naphthenate was further added as a catalyst, and the mixture was stirred until it became uniform.

The resulting coating composition was coated by dipping on a 3 mm thick polycarbonate shaped article, allowed to stand at room temperature for 30 minutes, and cured at 130° C. for 4 hours by a hot air circulating dryer. The resulting coated film had a thickness of about 10μ. The coated film had superior durability and scratch resistance as shown in Table 5.

Note

In the preparation of the melamine-alkyd resin in the above Example, the weight ratio of the melamine to the alkyd resin was 1:1 as solids content. This has the following meaning. Beccosol J-507 is commercially available as a solution containing about 50% by weight of the alkyd resin as solids (solvent, xylene). The melamine-alkyd resin is prepared by mixing the solution with melamine. In the indication of the mixing ratio, the xylene solvent is not taken into consideration, and only the ratio of the weight of the melamine to the alkyd resin is expressed.

COMPARATIVE EXAMPLES 1 to 3

The mixing ratios between the silane derivative reaction mixture and the melamine-alkyd resin were different from those in Examples 1 to 5, as shown in Table 5. The amount of the catalyst added, the diluting solvent, the type of the shaped article coated, and the other experimental conditions were the same as in Examples 1 to 5.

EXAMPLES 6 to 13

A reactor having four openings was charged with 2.5 g (0.011 mole) of N-(trimethoxysilylpropyl)-ethylenediamine and 7.0 g (0.034 mole) of N-(dimethoxymethylsilylpropyl)-ethylenediamine, and with stirring, they were heated to 100° C. With stirring, 20.6 g (0.087 mole) of γ-glycidoxypropyltrimethoxy silane was added dropwise, whereupon the mixture became somewhat viscous. The mixture was stirred for an additional 30 minutes to afford a silane derivative reaction mixture (component A). To a solution of 10 g of the reaction mixture in 25 g of isobutanol were added a melamine alkyd resin (component B) obtained by mixing isobutyl-etherified methylol melamine (Yuban 60 R, a trademark for a product of Mitsui Toatsu Chemical, Co., Inc.) and phthalic anhydride-type alkyd resin (Beccosol J-507, a trademark for a product of Dainippon Ink and Chemicals, Inc.) in a weight ratio of 1:1 as solids, and methyl methacrylate (component C) in the amounts shown in Table 6. A small amount of cobalt naphthenate was added as a catalyst, and the mixture was stirred until it became uniform.

The resulting coating composition was coated by dipping on a 3 mm thick shaped article of polycarbonate, allowed to stand at room temperature for 30 minutes, and then cured at 130° C. for 4 hours by a hot air circulating dryer. The resulting coated film had a thickness of about 10μ. The coated films had superior durability and scratch resistance as shown in Table 6.

COMPARATIVE EXAMPLES 4 AND 5

In these Comparative Examples, the mixing proportions of the silane derivative reaction mixture, the melamine-alkyd resin, and methyl methacrylate were different from those in Examples 6 to 13, as shown in Table 6. The amount of the catalyst, the diluting solvent, the type of the shaped article coated, and the other experimental conditions were quite the same as in Examples 6 to 13.

Table 5

| Run No. | Amount of the silane derivative reaction mixture (g) | Amount of the melamine alkyd resin [g(wt.%)] | Adhesion after the curing treatment | Scratch resistance Steel wool test | Scratch resistance Taber abrasion test | Hot water resistance [time [adhesion)] |
|---|---|---|---|---|---|---|
| E. 1 | 10 | 3 (23) | 100 | A' | 95 | 16 (10) |
| E. 2 | 10 | 4 (29) | 100 | A' | 95 | 24 (10) |
| E. 3 | 10 | 6 (38) | 100 | A' | 95 | 24 (50) |
| E. 4 | 10 | 8 (44) | 100 | A | 90 | 16 (30) |
| E. 5 | 10 | 10 (50) | 100 | A | 90 | 8 (80) |
| C. 1 | 10 | 0 | Peeled after curing | Not measured because the coated film peeled off. | | |
| C. 2 | 10 | 1.5 (13) | 100 | A' | 97 | 1 (0) |
| C. 3 | 10 | 15 (60) | 70–60 | B | 85 | 2 (0) |

E. = Example, C. = Comparative Example

The parentheses in the third column show the percent by weight based on the total weight of components (A) and (B).

Table 6

| Run No. | Amount of the silane derivative reaction mixture (g) (A) | Amount of the melamine alkyd resin [g(wt.%)] (B) | Amount of MMA [g(wt.%)] (C) | Type of catalyst | Diluting solvent | Adhesion after the curing treatment | Scratch resistance | | Hot water resistance [time (adhesion)] | Type of the article coated |
|---|---|---|---|---|---|---|---|---|---|---|
| | | | | | | | Steel wool test | Taber abrasion test | | |
| Ex. 6 | 10 | 8 (44) | 4 (18) | Cobalt naphthenate | Iso butanol | 100 | A' | 92 | 40 (20) | Polycarbonate |
| Ex. 7 | 10 | 10 (50) | 4 (17) | " | " | 100 | A' | 95 | 40 (20) | " |
| Ex. 8 | 10 | 6 (38) | 4 (20) | " | " | 100 | A' | 92 | 32 (40) | " |
| Ex. 9 | 10 | 3 (23) | 4 (24) | " | " | 100 | A' | 92 | 24 (50) | " |
| Ex. 10 | 10 | 4 (20) | 4 (29) | " | " | 100 | A' | 92 | 24 (80) | " |
| Ex. 11 | 10 | 12 (55) | 4 (15) | " | " | 100 | A | 90 | 32 (98) | " |
| Ex. 12 | 10 | 5 (33) | 2 (12) | " | " | 100 | A' | 95 | 32 (98) | " |
| Ex. 13 | 10 | 5 (33) | 1 (6) | " | " | 100 | A A' | 92 | 24 (72) | |
| CE. 4 | 10 | 5 (33) | 0.5(3) | " | " | 100 | A - A' | 95 | 16 (50) | " |
| CE. 5 | 10 | 5 (33) | 10 (40) | " | " | 100* | B | 85 | 16 (20) | " |

*A light opalescent haze was noted in the coated film.
The parentheses in the third column represent the weight percent of (B) based on (A) + (B), and the parentheses in the fourth column represent the weight percent of (C) based on the total weight of (A) + (B) + (C).

EXAMPLE 14

A four-necked flask was charged with 2.5 g (0.011 mole) of N-(trimethoxysilylpropyl)-ethylenediamine and 7.0 (0.034 mole) of N-(dimethoxymethylsilylpropyl)-ethylenediamine, and with stirring, they were heated to 100° C. With stirring, 10.6 g (0.045 mole) of γ-glycidoxypropyltrimethoxysilane was added dropwise gradually, whereupon the mixture became somewhat viscous. Then, the mixture was stirred for an additional 30 minutes to afford a silane derivative reaction mixture. After allowing it to stand until its temperature became room temperature, 10.0 g (0.042 mole) of γ-glycidoxypropyltrimethoxysilane was further added, and they were mixed with stirring until the mixture became uniform. The resulting silane derivative reaction mixture (10 g) was dissolved in 25 g of isobutanol. The solution was mixed with a melamine-alkyd resin obtained by mixing isobutyletherified methylol melamine (Yuban 60 R, a trademark for a product of Mitsui Toatsu Chemicals, Inc.) and a phthalic anhydride-type alkyd resin (Beccosol J-507, a trademark for a product of Dainippon Ink and Chemicals, Inc.) in a weight ratio of 1:1 as solids and methyl methacrylate (MMA) and as a catalyst, cobalt naphthenate in the same proportions as in Examples 6 to 13.

The resulting coating composition was coated on a 3 mm thick shaped article of polycarbonate, and cured under heat in the same way as in Examples 6 to 13. The coated film obtained was superior as in Examples 6 to 13, and had a thickness of about 10μ.

EXAMPLE 15

A four-necked flask was charged with 7.5 g (0.034 mole) of N-(trimethoxysilylpropyl)-ethylenediamine and 2.3 (0.011 mole) of N-(dimethoxysilylpropyl)-ethylenediamine, and with stirring, they were heated to 100° C. Then, 10.6 g (0.045 mole) of γ-glycidoxypropyltrimethoxy silane was added dropwise with stirring, whereupon the mixture became somewhat viscous. The mixture was stirred for an additional 30 minutes to form a silane derivative reaction mixture. The same operation as in Example 6 was then performed except that 10 g of the reaction mixture obtained was used as component (A). Cobalt naphthenate was used as a catalyst. A 3 mm thick shaped article of polycarbonate was used as a substrate to be coated. The coated film so obtained had a thickness of about 10μ, an adhesion, after the curing treatment, of 100, a steel wool test rank of A', a Taber abrasion test value of 95%, and a hot water resistance time (adhesion) of 32(50), thus exhibiting superior durability and scratch resistance.

EXAMPLE 16

A four-necked flask was charged with 8.9 g (0.04 mole) of N-(trimethoxysilylpropyl)-ethylenediamine, and with stirring, they were heated to 100° C. Then, with stirring, 9.4 g (0.04 mole) of γ-glycidoxypropyl trimethoxy silane was added dropwise, whereupon the reaction mixture became somewhat viscous. Then, the mixture was stirred for an additional 30 minutes to form a silane derivative reaction mixture. The same operation as in Example 6 was then performed except that 10 g of the resulting reaction mixture was used as component (A). Cobalt naphthenate was used as a catalyst, and a 3 mm thick shaped article of polycarbonate was used as a substrate to be coated. The resulting coated film had an adhesion, after the curing treatment, of 100, a steel wool test rank of A', a Taber abrasion test value of 95%, and a hot water resistance time (adhesion) of 32 (10), exhibiting superior durability and scratch resistance. The thickness of the coated film was about 10μ.

EXAMPLE 17

Dehydrated isobutanol (90 g) and 0.806 g (0.0448 mole) of water were weighed and put into a 200 cc beaker, and uniformly mixed. With stirring, 5 g (0.0234 mole) of N-(trimethoxysilylpropyl)-ethylenediamine was added dropwise, and then 5 g (0.0212 mole) of γ-glycidoxypropyltrimethoxy silane was added dropwise with stirring. The stirring was stopped when the entire solution became uniform. The solution was transferred into a glass vessel equipped with a stopper. While the glass vessel was sealed, it was allowed to stand for 90 minutes in a constant temperature air bath at 50° C. to partially hydrolyze and age the solution. The product was cooled to room temperature. The same operation as in Example 6 was then performed except that 100 g of the resulting silane derivative reaction mixture was used as an isobutanol solution. Cobalt naphthenate was used as a catalyst, and a 3 mm thick shaped article of polycarbonate was used as a substrate to be coated.

The coated film obtained had a thickness of about 5μ. It has an adhesion, after the curing treatment, of 100, a steel wool test rank of A', a Taber abrasion test value of 95%, and a hot water resistance time (adhesion) of 24(30), exhibiting superior durability and scratch resistance.

EXAMPLE 18

Ten grams of the silane derivative reaction mixture obtained by the operation of Example 6 was dissolved in 25 g of isobutanol. The resulting solution was mixed with 4 g (as solids) of a melamine-alkyd resin obtained by mixing n-butyl-etherified methylol melamine (Yuban 20SE-60, a trademark for a product of Mitsui Toatsu Chemicals, Inc.) and a phthalic anhydride-type alkyd resin (Beccosol J-507, a trademark for a product of Dainippon Ink and Chemicals, Inc.) in a weight ratio of 1:1 as solid, and 2.3 g of MMA. A small amount of p-toluenesulfonic acid was added as a catalyst. The mixture was stirred until it became uniform.

The resulting coating composition was applied by dip coating on a 3 mm thick shaped article of polycarbonate, and by the same procedure as in Example 6, a cured coated film was obtained. The coated film had a thickness of about 10μ. The coated film had an adhesion, after the curing treatment, of 100, a steel wool test rank of A', a Taber abrasion test value of 95%, and a hot water resistance time (adhesion) of 40(20), exhibiting superior durability and scratch resistance.

EXAMPLE 19

A coated film was prepared in the same way as in Example 18 except that 10 g, as solids content, of a phthalic anhydride-type oil-free alkyd resin (Beccolite M-6401-50, a trademark for a product of Dainippon Ink and Chemicals, Inc.) was used as the alkyl resin, and 2.3 g of n-butyl methacrylate was used instead of MMA. As a substrate, a 2 mm thick shaped article of polycarbonate was used, and p-toluenesulfonic acid was used as a catalyst. The resulting coated film had a thickness of about 10μ. The coated film had an adhesion, after the curing treatment, of 100, a steel wool test rank of A', a Taber abrasion test of 95%, and a hot water resistance time (adhesion) of 40 (25), exhibiting superior durability and scratch resistance.

EXAMPLE 20

A coated film was prepared in the same way as in Example 19 except that 10 g, as solids, of an isophthalic acid-type alkyd resin (Superbeccosol ES-4011, a trademark for a product of Dainippon Ink and Chemicals, Inc.) was used as the alkyd resin. As a catalyst, p-toluenesulfonic acid was used, and a 3 mm thick shaped article of polycarbonate was used. The coated film had a thickness of about 10μ. It had an adhesion, after the curing treatment, of 100, a steel wool test rank of A', a Taber abrasion test value of 95%, and a hot water resistance time (adhesion) of 40(20), exhibiting superior durability and scratch resistance.

EXAMPLE 21

A coated film was prepared in the same way as in Example 20 except that 10 g, as solids, of isobutyletherified methylol melamine (Yuban 60R, a trademark for a product of Mitsui Toatsu Chemicals, Inc.) was used as the melamine resin, and 2.3 g of glycidyl methacrylate was used instead of the n-butyl methacrylate. As a catalyst, p-toluenesulfonic acid was used, and a 3 mm thick shaped article of polycarbonate was used as a substrate to be coated. The resulting coating film had a thickness of about 10μ. It had an adhesion, after the curing treatment, of 100, a steel wool test rank of A', a Taber abrasion test value of 95%, and a hot water resistance time (adhesion) of 40(15), exhibiting superior durability and scratch resistance.

EXAMPLE 22

The coating composition obtained in Example 6 was mixed with a small amount of phosphoric acid as a catalyst. The resulting composition was coated on a shaped article of poly(methyl methacrylate), allowed to stand at room temperature for 30 minutes, and then cured at 100° C. for 4 hours by a hot air circulating dryer. The resulting coated film had a thickness of about 10μ. It had an adhesion, after the curing treatment, of 100, a steel wool test rank of A', a Taber abrasion test value of 96%, and a hot water resistance time (adhesion) of 40(10), exhibiting superior durability and scratch resistance.

EXAMPLE 23

The coating composition obtained in Example 6 was mixed with a small amount of phosphoric acid as a catalyst, and the resulting coating composition was coated on a shaped article of polystyrene, allowed to stand for 30 minutes at room temperature, and then cured at 60° C. for 4 hours by a hot air circulating dryer. The resulting coating film had a thickness of about 10μ. The coated film had the same properties as in Example 22.

EXAMPLE 24

The cured coated film obtained in Example 6 was placed on a rotating plate disposed at a distance of 1 mm from three 500 W mercury vapor lamps above it, and subjected to a test for ultraviolet light resistance. No crack was seen to form on the coated film even after it had been exposed for more than 240 hours. On the other hand, a coated film was prepared by diluting the silane derivative reaction mixture obtained in Example 6 with isobutanol, coating the product on a 3 mm thick shaped article of polycarbonate, allowing it to stand at room temperature for 30 minutes and then curing it at 130° C. for 4 hours. The resulting coating film, in the same test for ultraviolet light resistance, developed cracks when exposed to ultraviolet irradiation under the same conditions for 4 hours.

EXAMPLE 25

A coated film was prepared by diluting the silane derivative reaction mixture obtained in Example 6 with isobutanol, coating the resulting product on a 3 mm thick shaped article of polycarbonate, allowing it to stand for 30 minutes, and curing it at 130° C. for 4 hours. The cured coated film thus obtained and the cured coated film obtained in Example 6 were each subjected to an environmental test in which a heat cycle of −10° to −20° C.⇌65° C. was performed in a high humidity atmosphere with one cycle consuming 24 hours. As a result, the former showed an adhesion of 92 in the seventh cycle, but the adhesion of the latter was 0 in the first cycle.

What we claim is:

1. A surface-coating composition for plastic articles, which comprises as a film-forming agent a mixture of (A) a mixture of the reaction of an aminoalkylalkoxy silane of the general formula

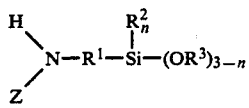

wherein $R^1$ represents a divalent hydrocarbon group containing 1 to 4 carbon atoms, $R^2$ and $R^3$ represent a monovalent hydrocarbon group containing 1 to 4 carbon atoms, Z represents a hydrogen atom or an aminoalkyl group, and n is 0 or 1, with an epoxyalkylakoxy silane of the general formula

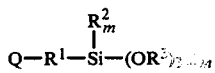

wherein $R^1$, $R^2$ and $R^3$ are as defined above, Q represents a glycidoxy group

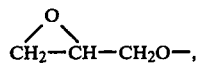

or an epoxycyclohexyl group, and m is 0 or 1, and (B) a mixture of an alkyl-modified methylol melamine of the general formula

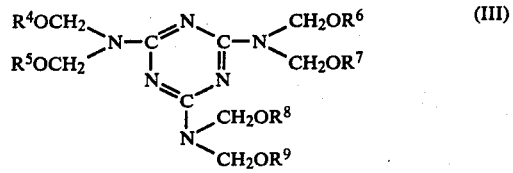

wherein $R^4$, $R^5$, $R^6$, $R^7$, $R_8$ and $R^9$ represent a hydrogen atom or a monovalent hydrocarbon group with 1 to 4 carbon atoms, and an alkyd resin; the amount of component (A) being 45 to 80% by weight, and the amount of component (B) being 20 to 55% by weight, both based on the total amount of components (A) and (B).

2. The composition of claim 1 wherein the reaction mixture (A) is obtained by mixing 20 to 70 mole% of the aminoalkylalkoxy silane and 30 to 80 mole% of the epoxyalkylalkoxy silane, and reacting them.

3. The composition of claim 1 wherein the mixture (B) is a mixture of 10 to 70% by weight of the alkyl-modified methylol melamine and 30 to 90% by weight of the alkyd resin.

4. The composition of claim 1 which further contains (C) an acrylic acid derivative of the general formula

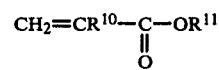

wherein $R^{10}$ represents a hydrogen atom or a methyl group, and $R^{11}$ represents a hydrogen atom, a hydrocarbon group containing 1 to 4 carbon atoms, a hydroxyalkyl group or a glycidyl group, or its polymer of a low degree of polymerization, the amount of component (C) being 5 to 30% by weight based on the total amount of components (A), (B) and (C).

5. The composition of claim 4 wherein the reaction mixture (A) is obtained by mixing 20 to 70 mole% of the aminoalkylalkoxy silane and 30 to 80 mole% of the epoxyalkylalkoxy silane, and reacting them.

6. The composition of claim 4 wherein the mixture (B) is a mixture of 10 to 70% by weight of the alkyl-modified methylol melamine and 30 to 90% by weight of the alkyd resin.

* * * * *